(12) United States Patent
Zucker et al.

(10) Patent No.: US 8,799,517 B2
(45) Date of Patent: Aug. 5, 2014

(54) ONLINE SALES METHOD FOR INFORMATION HANDLING SYSTEMS AND RELATED PERIPHERALS

(75) Inventors: Brian T. Zucker, Austin, TX (US); William L. Boles, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/614,381

(22) Filed: Sep. 13, 2012

(65) Prior Publication Data

US 2013/0018754 A1 Jan. 17, 2013

Related U.S. Application Data

(63) Continuation of application No. 11/469,022, filed on Aug. 31, 2006, now abandoned.

(51) Int. Cl.
*H04L 29/06* (2006.01)
*G06Q 30/06* (2012.01)

(52) U.S. Cl.
USPC .................... 709/246; 717/175; 705/36.5

(58) Field of Classification Search
CPC .......... A63F 2300/20; A63F 2300/203; A63F 2300/552; A63F 2300/60; H04N 21/25891; H04N 21/44222; H04N 21/472; G06F 3/038; G06F 8/63; G06F 9/4411; G06N 3/126; G09G 2310/04; G09G 2370/24; G09G 5/008
See application file for complete search history.

(56) References Cited

U.S. PATENT DOCUMENTS

| | | | |
|---|---|---|---|
| 5,630,754 A | 5/1997 | Rebane | |
| 5,991,543 A | 11/1999 | Amberg et al. | |
| 5,995,757 A | 11/1999 | Amberg et al. | |
| 6,038,367 A * | 3/2000 | Abecassis | 386/262 |
| 6,167,383 A * | 12/2000 | Henson | 705/26.5 |
| 6,182,275 B1 * | 1/2001 | Beelitz et al. | 717/175 |
| 6,236,901 B1 | 5/2001 | Goss | |
| 6,327,706 B1 | 12/2001 | Amberg et al. | |
| 6,331,856 B1 * | 12/2001 | Van Hook et al. | 345/503 |
| 6,335,927 B1 * | 1/2002 | Elliott et al. | 370/352 |
| 6,738,065 B1 * | 5/2004 | Even-Zohar | 345/473 |
| 7,295,608 B2 | 11/2007 | Reynolds et al. | |
| 7,379,067 B2 * | 5/2008 | Deering et al. | 345/506 |
| 7,433,533 B2 * | 10/2008 | Qin | 382/254 |
| 2003/0066057 A1 * | 4/2003 | RuDusky | 717/140 |
| 2003/0198405 A1 * | 10/2003 | Ali | 382/307 |
| 2004/0045030 A1 * | 3/2004 | Reynolds et al. | 725/110 |
| 2004/0075750 A1 * | 4/2004 | Bateman | 348/231.1 |

(Continued)

*Primary Examiner* — Ryan Zeender
*Assistant Examiner* — Dana Amsdell
(74) *Attorney, Agent, or Firm* — Terrile, Cannatti, Chambers & Holland, LLP; Stephen A. Terrile

(57) ABSTRACT

A configurator is provided with the ability to present to a user how each choice or change to an information handling system would affect the performance of the information handling system for an intended use. More specifically, during an online sales process, the customer is first presented with a list of gaming genres or gaming titles for which the information handling system to be purchased is targeted to use along with a base or recommended configuration. The configuration process proceeds with each discrete choice now presented to the user not only with the price but also with the specific system performance impact of that item, such as showing a Frame Per Second indication. A new set of fields are provided for each item in the configuration database and may be proportional to the number of gaming genres or titles presented to the customer at the first selection screen.

6 Claims, 4 Drawing Sheets

(56) References Cited

U.S. PATENT DOCUMENTS

| | | | |
|---|---|---|---|
| 2005/0010963 A1* | 1/2005 | Zeng et al. | 725/131 |
| 2005/0130744 A1* | 6/2005 | Eck et al. | 463/43 |
| 2005/0246433 A1* | 11/2005 | Carrigan et al. | 709/223 |
| 2006/0090010 A1* | 4/2006 | Qin | 709/246 |
| 2007/0014363 A1* | 1/2007 | Golas et al. | 375/240.16 |
| 2007/0060345 A1* | 3/2007 | Edwards | 463/31 |
| 2007/0092004 A1* | 4/2007 | Ho | 375/240.12 |
| 2007/0202941 A1* | 8/2007 | Miltenberger et al. | 463/25 |
| 2010/0166062 A1* | 7/2010 | Perlman et al. | 375/240.05 |

* cited by examiner

ONLINE SALES METHOD FOR INFORMATION HANDLING SYSTEMS AND RELATED PERIPHERALS

This application is a continuation of application Ser. No. 11/469,022, filed Aug. 31, 2006 now abandoned, which is incorporated herein by reference in its entirety.

BACKGROUND OF THE INVENTION

1. Field of the Invention

The present invention relates to configuring information handling system and more particularly to an online sales method for providing performance information regarding an intended use of the information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to sell information handling systems online, often with a configuration system that allows for the selection of components and their associated prices. In certain known configuration systems, the only characteristic presented with each selection is the price of the selection. Additional effort is often required by the purchaser to research specific differences if the differences are not clearly pointed out on the configuration page.

When a customer is trying to configure a high end information handling system such as is often used for gaming purposes, there is usually very little information presented regarding each specific item and how it will effect the gaming experience. The effect on the gaming experience is usually related to the performance of the information handling system or peripheral.

It would be desirable to provide a customer with information regarding how each choice or change to an information handing system in the configurator would effect the performance of the information handling system for a certain game or class of games.

SUMMARY OF THE INVENTION

In accordance with the present invention, a configurator is provided with the ability to present to a user how each choice or change to an information handling system would effect the performance of the information handling system for an intended use. More specifically, during an online sales process, the customer is first presented with potential intended uses for the information handling system such as a list of gaming genres or gaming titles for which the information handling system to be purchased is targeted to use along with a base or recommended configuration. The configuration process proceeds with each discrete choice now presented to the user not only with the price but also with the specific system performance impact of that item, such as showing a Frame Per Second indication. A new set of fields are provided for each item in the configuration database and may be proportional to the number of gaming genres or titles presented to the customer at the first selection screen. As the customer proceeds through the configuration process the total price of the configured information handling system is presented along with the performance data.

More specifically, in one embodiment the invention relates to a system for enabling configuration of an information handling system. The system includes a configurator, a checkout module and a database. The configurator configures an information handling system with options selected according to user input. The configurator includes a validator and a performance information module. The validator validates configuration of the system. Performance information based upon the options selected by the user during configuration of the information handling system are provided by the performance information module. Payment options and obtaining payment and delivery information are presented by the checkout module. The database receives information from and supplies information to the configurator.

In another embodiment, the invention relates to an apparatus for enabling configuration of an information handling system. The apparatus includes a configuration module, a checkout module and a database. The configuration module enables configuring a system with options selected according to user input. The configuration module includes a validation module and a performance information module. The validation module validates configuration of the system. Performance information based upon the options selected by the user during configuration of the information handling system are provided by the performance information module. Payment options and obtaining payment and delivery information are presented by the checkout module. The database receives information from and supplies information to the configurator.

In another embodiment, the invention relates to a method for configuring an information handling system. The method includes configuring a system with options selected according to user input. The configuring includes validating configuration of the system and presenting performance information based upon the options selected by the user during configuration of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An online store is one component of an Internet website to which a customer may go to configure a particular information handling system, for example, according to desired options of the customer. The online store is typically a subset of a larger Internet website. At the online store, a customer can select one or more products in which the customer is interested. Upon selection of a particular product, the online store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the online store application controls.

Figure 1:
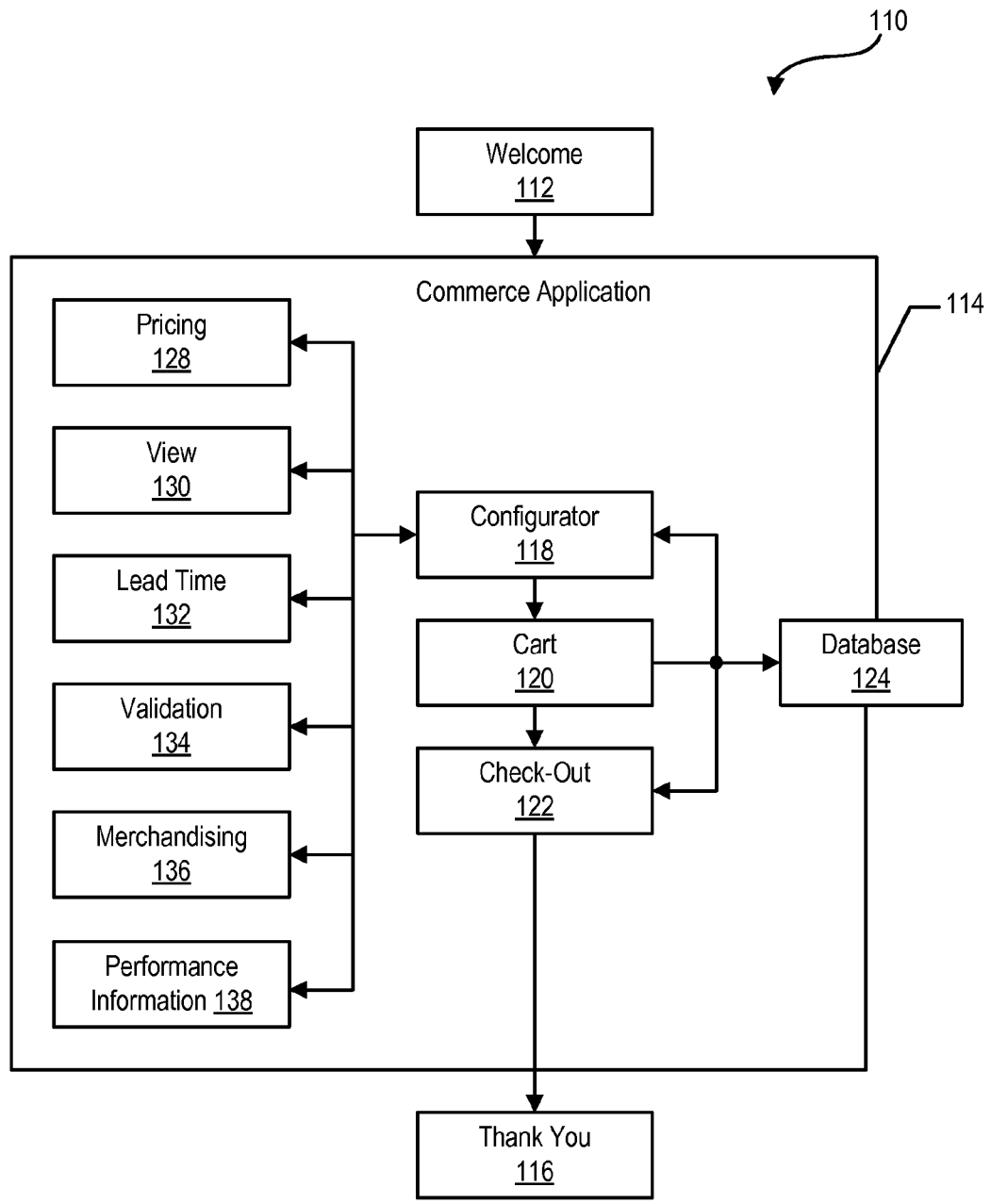
FIG. 1 shows an overview block diagram representation of an online store.

Referring now to FIG. 1, an online store 110 for use in generating customer configured information handling systems, e.g., customer configured computer systems, is shown. The online store 110 includes a welcome or introductory module 112, a commerce application module 114, and a thank you module 116. The online store 110 includes an online store user interface which enables the system configuration, pricing, and ordering of an information handling system via the Internet. The commerce application 114 includes a configurator 118, shopping cart 120, a checkout module 122, a services activation module 123 and database 124. The database 124 provides information to the configurator 118, shopping cart 120, checkout module 122. The configurator 118 includes a pricing module 128, a view module 130, a lead time warning module 132, a validation (or compatibility) warning module 134, a merchandising module 136 and a performance information module 138. The various modules of the configurator 118 are driven by data from the database 124, and thus the configurator 118, shopping cart 120, and checkout module 122 are all linked to the database 124.

In operation of the online store 110, the welcome module 112 presents a welcome page 112, the configurator 118 presents a configurator page, the shopping cart 120 presents a shopping cart page, the checkout module 122 presents a checkout page, and the thank you module 116 presents a thank you page. The welcome page includes a static page and generally resides outside of the commerce application 114. The configurator page, shopping cart page, and checkout page are within the commerce application and use information provided by the database. The checkout includes a payment feature, delivery feature, personal verses business feature, and instructional text features (i.e., how to fill out an online form.)

The welcome page is typically an introductory page and includes a link into the online store 110. The welcome page is typically a static welcome page. Upon completion of configuration of a system, the customer is transferred to a checkout page. After completion of the checkout, the customer is transferred to a static thank you page 116. The thank you page 116 provides a message of gratitude to the customer for having placed the order or for visiting the online store.

Aspects of the configurator 118 which interact with database 124 are shown in FIG. 1. In essence, the entire commerce application 114 interacts with the database. The configurator 118, shopping cart 120, and checkout module 122 are each part of the commerce application 114 and interact with the database 124. For example, with the shopping cart 120, additional merchandising information associated with a particular system which has been configured and placed in the shopping cart by an online store customer can be provided.

The performance information module 138 provides the configurator 118 with the ability to present to a user how each choice or change to an information handling system would effect the performance of the information handling system for an intended use of the information handling system such as for certain game or class of games. More specifically, during an online sales process, the customer is first presented with intended uses such as a list of gaming genres or gaming titles for which the information handling system to be purchased is targeted to use along with a base or recommended configuration. The configuration process proceeds with each discrete choice presented to the user not only with the price but also with the specific system performance impact of that selection, such as showing a Frame Per Second indication. A set of fields are provided for each item in the configuration database and may be proportional to the number of gaming genres or titles presented to the customer at the first selection screen. As the customer proceeds through the configuration process, the total price of the configured information handling system is presented along with the performance data.

Figure 2:
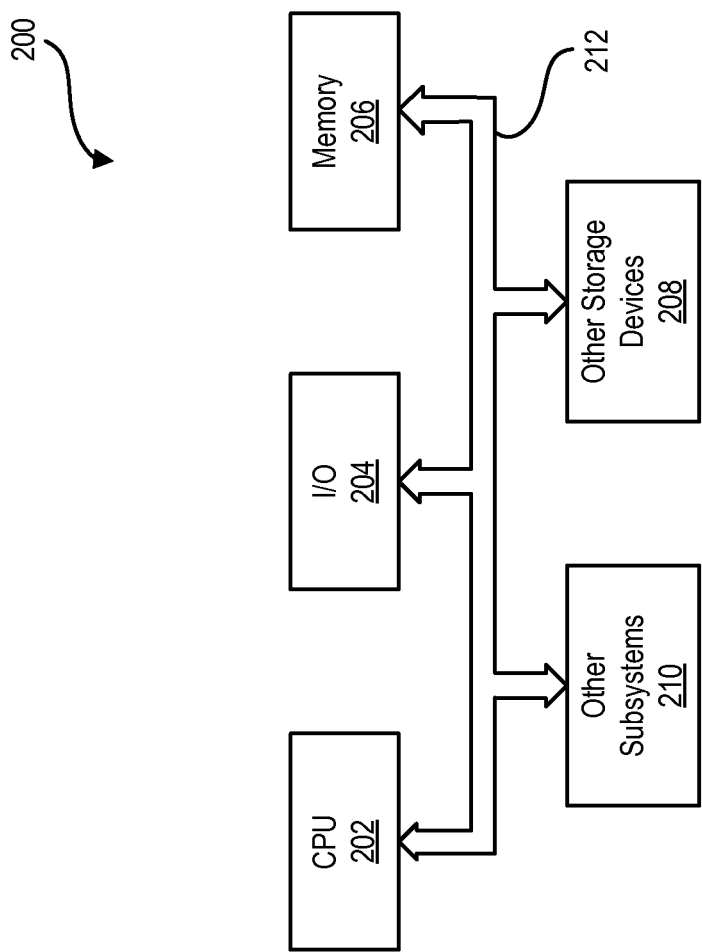
FIG. 2 shows a schematic block diagram of an information handling system.

Referring to FIG. 2, a system block diagram of an information handling system 200 is shown. The information handling system 200 includes a processor 202, input/output (I/O) devices 204, such as a display, a keyboard, a mouse, and associated controllers, memory 206 including non-volatile memory such as a hard disk drive and volatile memory such as random access memory, and other storage devices 208, such as a floppy disk and drive and other memory devices, and various other subsystems 210, all interconnected via one or more buses, shown collectively as bus 212.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3A:
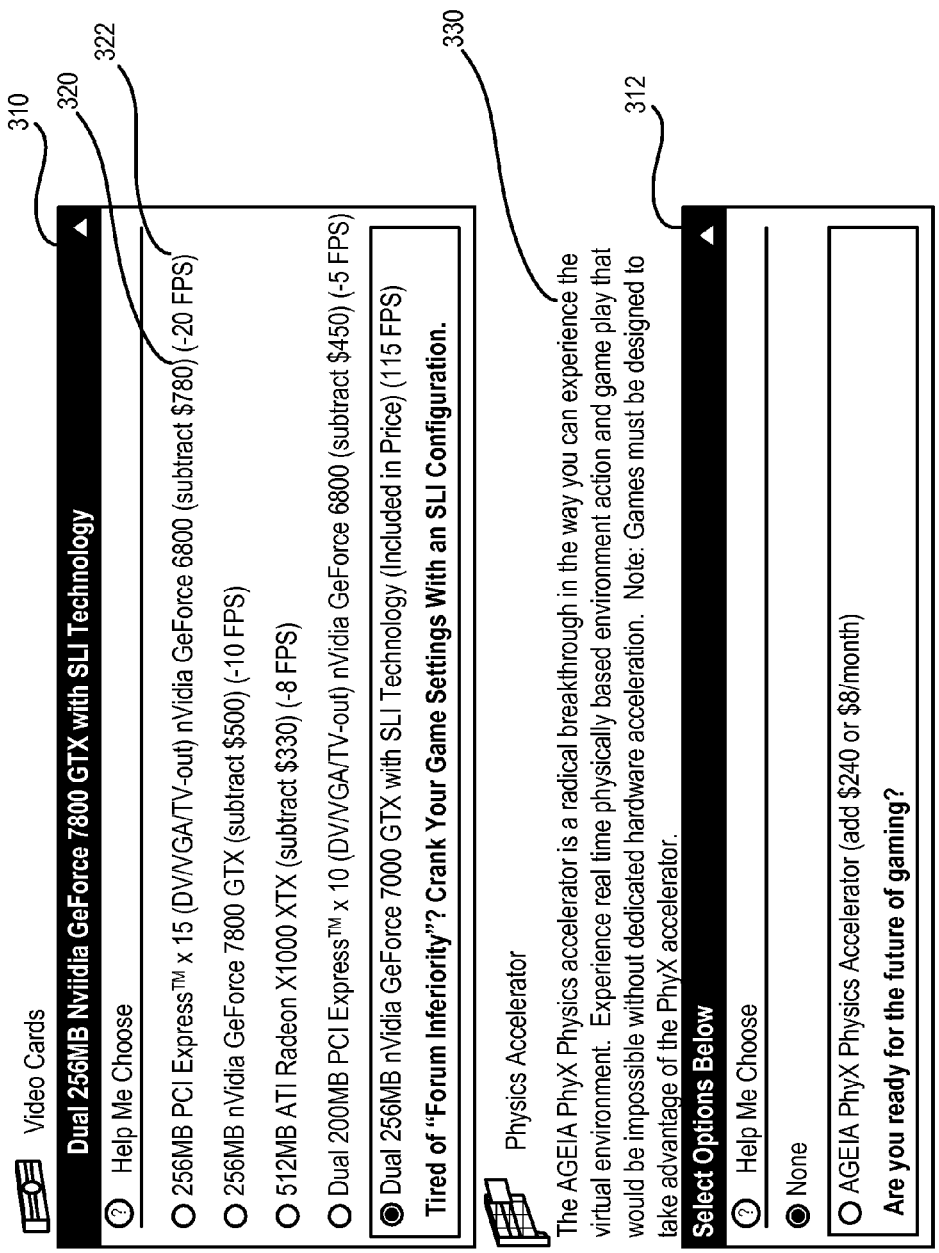
FIGS. 3A and 3B, generally referred to as FIG. 3, show an example screen presentation of a configurator which includes configuration performance information.
Figure 3B:
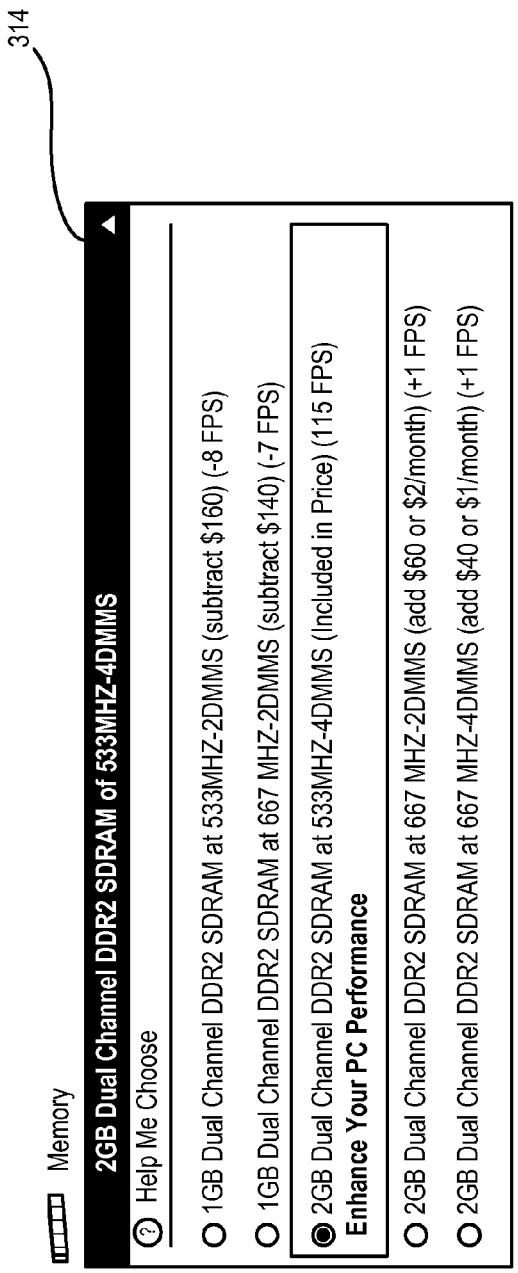

Referring to FIG. 3, an example screen presentation 300 of a configurator which includes configuration performance information is shown. More specifically, one example of a component which is often upgraded when configuring an information handling system for high end performance use such as for gaming is a video card. Another example of a component which is added to an information handling system which is configured for high end performance is a physics accelerator. Another example of a component which is upgraded when an information handling system is configured for high end performance is the amount and type of memory included within the information handling system. Accordingly, the configurator 118 presents a video card option selection portion 310 and a physics accelerator option selection portion 312 and a memory option selection portion 314.

Each option selection portion 310, 312, 314 includes a plurality of selections which may be included within a configured information handling system. Most selections include pricing information 320. Additionally, because in the described embodiment, video card selections and memory selections effect the performance information being presented (e.g., the frames per second performance of the information handling system), selections within the video card selection portion 310 and the memory option selection portion 314 include performance information 322. In selected embodiments, the performance information is presented as an effect on the frame per second (FPS) operation of the information handling system. The effect can be an increase to the frames per second (e.g., +5 FPS) or a decrease to the frames per second (e.g., −4 FPS). The frames per second performance indication is an important performance indication to game operation because this performance indication effects the realism with which the game is presented on the information handling system.

The configurator presentation 300 also includes a performance information portion 330, which is associated with the physics accelerator option selection portion 312. The performance information portion 330 is an example of subjective information (as compared with the objective performance information such as the frames per second indication) which assists a user in configuring a system for a particular purpose. This information can be tailored within the configurator to provide information to users who indicate an intended use of the information handling system being configured. Thus for example, if a user is configuring an information handling system for video editing, various performance information portions might be included with respective components that can potentially be included within the configured information handling system.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that other types of performance information may also be presented along with the various configuration selections.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for enabling configuration of an information handling system, the system executing on a computer system, the system comprising:
   a configurator installed on a computer processor, the configurator enabling a user to configure the information handling system with a plurality options according to user input, the plurality of options being selected by the user during configuration of the information handling system, the plurality of options including a number of gaming genres or titles, the configurator including
      a validator, the validator validating configuration of the information handling system and confirming compatibility of the plurality of options selected by the user during configuration; and,
      a performance information module, the performance information module providing performance information based upon the plurality of options selected by the user during configuration of the information handling system, the performance information module presenting to a user how each choice or change to an information handling system configuration during configuration of the information handling system configuration effects performance of the information handling system for an intended use of the information handling system;
   a checkout module, the checkout module presenting payment plurality of options and obtaining payment and delivery information;
   a database, the database receiving information from and supplying information to the configurator, the checkout module; and wherein
   the performance information includes objective performance information associated with a particular option selection;
   the performance information is tailored to provide information based upon an intended use of the information handling system, the intended use of the information handling system being as a gaming system and including a particular game or genre of games, the performance information being tailored based upon the particular game or genre of games;
   the objective performance information includes an effect on a frames per second operation of the information handling system based upon the particular option selection, the frames per second operation effecting a realism with which the particular game or genre of games is presented; and,
   the database comprises a set of fields for each item in the database, the set of fields being related to the number of gaming genres or titles presented to the customer during configuration.

2. The system of claim 1 wherein:
   the performance information further includes subjective performance information.

3. An apparatus for enabling configuration of an information handling system comprising:
a configuration module, the configuration module enabling a user to configure the information handling system with plurality of options selected according to user input, the plurality of options being selected by the user during configuration of the information handling system, the plurality of options including a number of gaming genres or titles, the configuration module including
a validation module, the validation module validating configuration of the information handling system and confirming compatibility of the plurality of options selected by the user during configuration; and,
a performance information module, the performance information module providing performance information based upon the plurality of options selected by the user during configuration of the information handling system, the performance information module presenting to a user how each choice or change to an information handling system configuration during configuration of the information handling system configuration effects performance of the information handling system for an intended use of the information handling system;
a checkout module, the checkout module presenting payment plurality of options and obtaining payment and delivery information;
a database, the database receiving information from and supplying information to the configuration module and the checkout module; and wherein
the performance information includes objective performance information associated with a particular option selection;
the performance information is tailored to provide information based upon an intended use of the information handling system, the intended use of the information handling system being as a gaming system and including a particular game or genre of games, the performance information being tailored based upon the particular game or genre of games; and,
the objective performance information includes an effect on a frames per second operation of the information handling system based upon the particular option selection, the frames per second operation effecting a realism with which the particular game or genre of games is presented; and,
the database comprises a set of fields for each item in the database, the set of fields being related to the number of gaming genres or titles presented to the customer during configuration.

4. The apparatus of claim 3 wherein:
the performance information further includes subjective performance information.

5. A computer implemented method for configuring an information handling system comprising:
configuring the information handling system with plurality of options selected according to user input, the plurality of options including a number of gaming genres or titles, the configuring being executed on a computer system and including
validating configuration of the information handling system and confirming compatibility of the plurality of options selected by the user during configuration; and,
presenting performance information based upon the plurality of options selected by the user during configuration of the information handling system, the performance information presenting to a user how each choice or change to the information handling system during configuration of the information handling system configuration effects performance of the information handling system for an intended use of the information handling system; and wherein
the performance information includes objective performance information associated with a particular option selection;
the performance information is tailored to provide information based upon an intended use of the information handling system, the intended use of the information handling system being as a gaming system and including a particular game or genre of games, the performance information being tailored based upon the particular game or genre of games; and,
the objective performance information includes an effect on a frames per second operation of the information handling system based upon the particular option selection, the frames per second operation effecting a realism with which the particular game or genre of games is presented; and,
the database comprises a set of fields for each item in the database, the set of fields being related to the number of gaming genres or titles presented to the customer during configuration.

6. The method of claim 5 wherein:
the performance information further includes subjective performance information.

* * * * *